May 28, 1929.  P. G. PATER  1,714,568
REMOVABLE BEARING
Filed Nov. 21, 1927  2 Sheets-Sheet 1

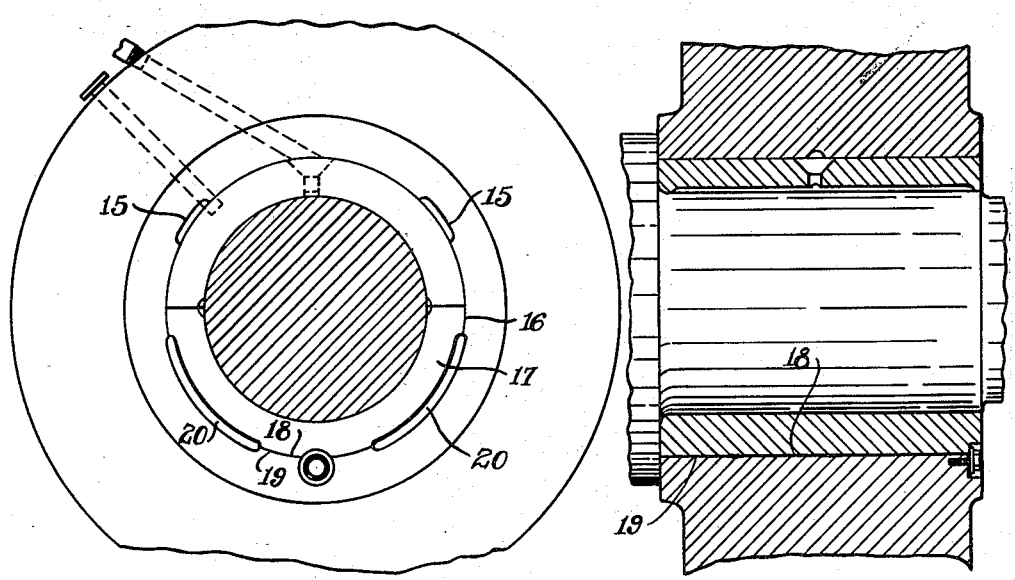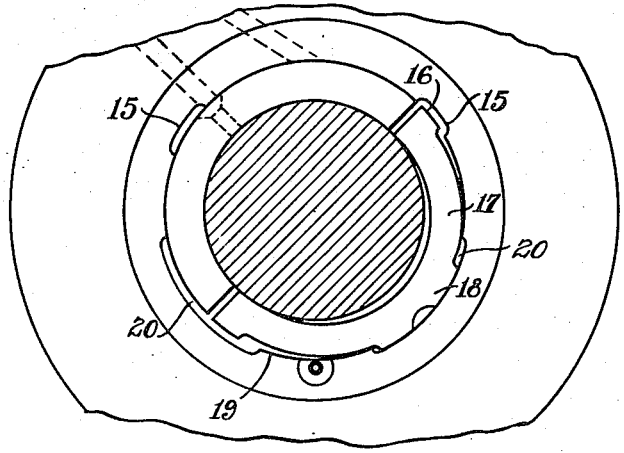

Patented May 28, 1929.

1,714,568

UNITED STATES PATENT OFFICE.

PAUL G. PATER, OF HAMILTON, OHIO, ASSIGNOR TO THE LONG & ALLSTATTER COMPANY, OF HAMILTON, OHIO.

REMOVABLE BEARING.

Application filed November 21, 1927. Serial No. 234,815.

This invention relates to improvements in removable bearings.

In the accompanying drawings, which serve for illustrating the invention in one form:

Figs. 4-6 illustrate a modified construction.

Figures 1, 2:
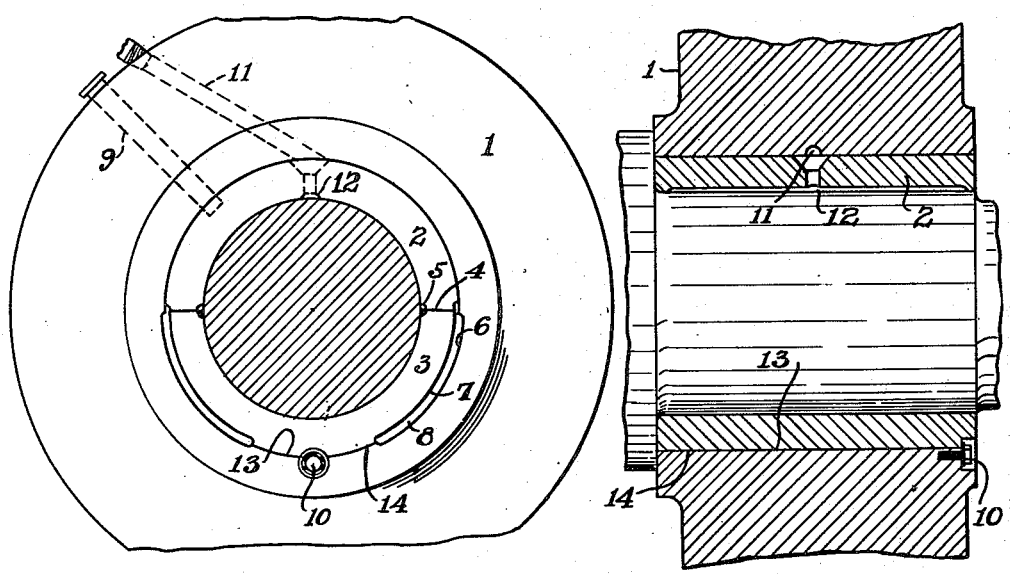
Fig. 1 is a detail view of the bearing in end elevation.
Fig. 2 is a view of the bearing in longitudinal section.

In heavy bearings of this character of ordinary construction, great difficulty is experienced in removing the bushings, whether solid sleeve or split sleeve bushings are used, when scoring or "freezing" of the bearing occurs from abnormal friction in the bearing, which may result from a number of causes, as insufficient lubrication, or the presence of foreign matter transmitted to the bearing through lubricating channels.

The objects attained in the invention consist in providing a split bearing, composed of two or more parts formed from an integral sleeve bushing, or composed of separate parts fitted together before the bushing is turned to size, one of the parts, the lower part of the bushing as herein shown and described, being provided with a plurality of axially extended recesses, and a portion intermediate the recesses finished on its outer periphery to the outside diameter of the bushing, or to fit the bore of the bearing housing and adapted to be moved to register with one or the other of two corresponding recesses in the bore for the bushing, on opposite sides of the vertical center line of the bearing to permit of moving the recessed half section of the bushing laterally away from the shaft or journal supported in the bearing, thus releasing both sections of the bushing which may then be readily removed and the bearing readjusted to normal conditions.

To this end the improved bearing, as illustrated in the drawings, consists of the bearing housing 1, in which are fitted opposite sections 2—3 of a longitudinally split bushing, the ends of the parts being matched or butted together as indicated at 4, the edges adjoining the journal and the bore for the bushing being chamfered, as indicated at 5, to avoid burr formation on these articulating edges as the bearing is assembled, or incident to its operation where the opposite half sections of the bushing are formed from an integral sleeve, by splitting the sleeve axially after it has been turned to size, suitable shims (not shown) are used between the ends of parts 2—3 for effecting proper fitting of the parts in the bore of the bearing housing.

Opposite axially extended recesses 6—7 are formed in the bore for the bushing in the bearing housing and parts 3 respectively, the recesses being formed on both sides of the vertical center of the bearing. The combined recesses 6—7 form spaces 8 between the lower section of the bushing and the bearing housing, and bearing portions 13—14 extended approximately 50°, as here shown, between the spaces 8, being less than the circumferential dimension of recesses 6.

Figure 3:
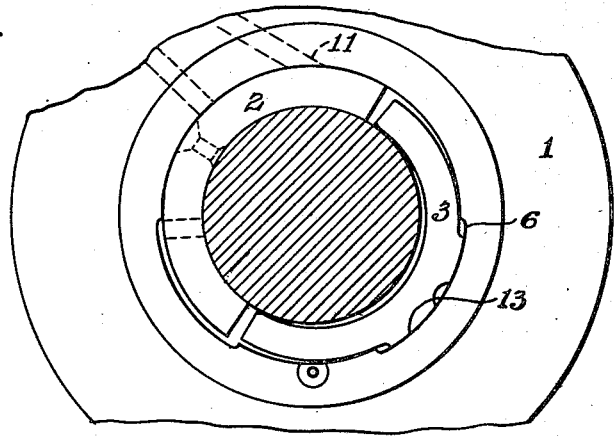
Fig. 3 is a view in end elevation showing the bearing bushings in position for removal.

When it becomes necessary or desirable to remove the bushing or adjust the bearing, the dowel 9 and set screw 10, which serve for holding the bushing parts 2—3 in fixed relation in the bearing housing, are removed which permits parts 2—3 to rotate with the shaft or journal until the bearing portion 13 is in register with one or the other of recesses 6, according to the direction in which the shaft is turned, as illustrated in Fig. 3. In this relation the lower section 3 of the bushing can readily be moved away from the shaft into the clearance provided by the recess 6, the opposite recesses 7 providing the clearance necessary for the opposite ends of part 3 as illustrated in the drawing. With part 3 moved free of the shaft, at one or both ends of the shaft according to the construction, the shaft can then be readily moved laterally free of part 2. Both sections of the bushing can thus be removed from the bore of the bearing housing if necessary for readjusting the bearing.

The usual oil duct 11—12 serves for supplying lubricant to the bearing.

The modified construction illustrated in Figs. 4-6 consists in added clearances 15 in the bore for the bushing, and bearing portions 16 on the outer periphery of the ends of the lower section 17 of the bushing which serve for supporting the ends of the bushing in the bearing. In this construction the bearing portions 18—19 and the clearance spaces 20 are correspondingly shorter than in the construction illustrated in Figs. 1-3, the bearing spaces 18—19 as shown in the modified construction being approximately 40° in circumferential dimensions. When the bearing is adjusted for displacing the lower section of the bushing as illustrated in Fig. 5, portions 16 register with spaces 15 which permits of lateral displacement.

I claim as my invention:

1. A bearing including a bearing housing having an aperture recessed axially and circumferentially, a bushing supported in the aperture split axially into a plurality of parts, one of said parts being recessed plurally axially and circumferentially on its outer periphery, and a raised peripheral portion between recesses in said part adapted to register with the recess in the bearing housing for effecting lateral displacement of said part.

2. A bearing including a bearing housing having an aperture recessed plurally axially and circumferentially, a bushing supported in the aperture split axially into a plurality of parts, one of said parts being recessed plurally axially and circumferentially on its outer periphery, a raised peripheral portion between recesses in said part adapted to register with either recess in said aperture for effecting lateral displacement of said part.

3. A bearing including a bearing housing having an aperture recessed axially and circumferentially on opposite sides of the vertical center line of the aperture, a bushing supported in the aperture split axially into a plurality of parts, one of said parts being recessed plurally axially and circumferentially on its outer periphery, a raised peripheral portion between recesses in said part adapted to register with either recess in said aperture for effecting lateral displacement of said part.

4. A bearing including a bearing housing having an aperture recessed axially and circumferentially on opposite sides of the vertical center line of the aperture, a bushing supported in the aperture split axially into a plurality of parts, one of said parts being recessed axially and circumferentially near its opposite ends, a raised peripheral portion between recesses in said part adapted to register with either recess in said aperture for effecting lateral displacement of said part, and engaging means acting to hold the sections of the bushing normally in fixed relation out of register with the recess in the bearing housing.

5. A bearing including a bearing housing having a peripheral recess in the bearing aperture, a bearing bushing split axially into a pluarilty of parts, one of said parts having a peripheral portion adapted to register with said recess for displacing said part.

6. A bearing including a bearing housing recessed plurally peripherally in the bearing aperture, a bearing bushing in said aperture split axially into a plurality of parts, sectional outer bearing surfaces near the opposite ends and intermediate the ends of one of the bushing parts normally out of register with said recesses and movable into register with certain thereof for displacing said part laterally.

7. A bearing including a bearing housing apertured for a bushing and recessed peripherally in the aperture, a bushing in said aperture split axially into a plurality of parts, certain of the parts comprising not less than half of the bushing having peripheral portions adapted to register with said recess for effecting displacement of the bushing.

In testimony whereof I have affixed my signature.

PAUL G. PATER.